P. THOMAS.
CONDENSER.
APPLICATION FILED JUNE 15, 1917.
1,351,074.
Patented Aug. 31, 1920.
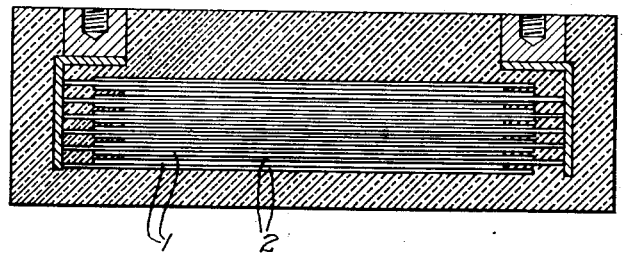
WITNESSES:
Geo D Barrett
W H Woodman
INVENTOR
Phillips Thomas.
BY
Wesley G Carr
ATTORNEY

UNITED STATES PATENT OFFICE.

PHILLIPS THOMAS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

CONDENSER.

1,351,074.  Specification of Letters Patent.  Patented Aug. 31, 1920.

Application filed June 15, 1917. Serial No. 175,047.

*To all whom it may concern:*

Be it known that I, PHILLIPS THOMAS, a citizen of the United States, and a resident of Edgewood Park, in the county of Allegheny and State of Pennsylvania, have invented a new and useful Improvement in Condensers, of which the following is a specification.

My invention relates to static electric condensers and it has for its object to provide a condenser which shall have high electrostatic capacity in proportion to its plate area and dimensions and which shall have high dielectric strength and resistance to temperature variations, these desirable properties being obtained by the use of dielectric material containing montan wax or montanic acid as an essential ingredient.

Electrostatic condensers of the kind to which my present invention relates have heretofore been commonly constructed with dielectric material containing paraffin wax as the principal insulating constituent. On account of the relatively low specific inductive capacity of paraffin wax and also on account of its relatively low melting point, attempts have been made to improve condensers of this type by utilizing other waxy bodies instead of paraffin wax. Chlorinated bodies, such as the polychlorinated derivatives of naphthalene, have been largely used as substitutes for paraffin wax for this purpose, but these chlorinated closed chain hydrocarbons have certain disadvantages, and in particular, are found to injure the workmen who handle them, causing serious skin diseases.

According to my present invention, I provide an electrostatic condenser of high capacity and good mechanical characteristics by the use of montan wax as the constituent of the dielectric. Montan wax, or lignite wax, is a natural wax obtained by extracting lignite or peat with suitable solvents and consists of fatty acids and a hydrocarbon constituent, the fatty acid portion being composed mainly of montanic acid $C_{29}H_{58}O_2$. This wax melts between 80° and 86° C. and has a specific inductive capacity of 4 to 4.5. These properties are the distinctive superior of the corresponding properties of paraffin wax which melts between 40° and 60° C. and has a specific inductive capacity of 2 to 3.

The drawing is a sectional view conventionally showing an electric condenser of the so-called stacked type embodying my invention, in which the condenser proper may comprise a plurality of layers of metallic foil 1 and interposed layers 2 of any suitable absorbent dielectric material, such as paper or the like, impregnated with montan wax or montanic acid. My invention, however, is in no way to be limited to the specific illustration of the drawing.

I employ crude or refined montan wax, or the montanic acid derived from montan wax, as an impregnating medium in electrostatic condensers in exactly the same way in which paraffin wax is utilized and in all of the different forms of condensers in which waxy dielectric bodies are used. The specific construction of the condenser is therefore immaterial so far as my present invention is concerned. It may be stated, however, that the usual method of using the wax consists in impregnating paper with the wax either by means of suitable solvents or by immersing the paper in the melted wax, laminations of the impregnated paper being alternated with laminations of tin foil or other suitable conducting material. The laminations of dielectric material and tin foil may either be cut out and alternately stacked one upon the other or strips of the two materials may be placed together and rolled up in accordance with the usual method of making rolled condensers. Since my invention contemplates the use of montan wax in all electrostatic apparatus where waxy dielectric materials are used, I desire that no limitations as to structure or methods of use be imposed upon my invention, the scope of which is set forth in the appended claims.

I claim as my invention:

1. An electric condenser unit including superimposed layers of conducting material having a dielectric comprising montan wax disposed between the adjacent layers.

2. An electric condenser having a dielectric comprising absorbent material impregnated with montan wax.

3. An electric condenser having a dielectric comprising fibrous absorbent material impregnated with montan wax.

4. An electric condenser having a dielectric comprising paper impregnated with montan wax.

5. An electric condenser unit including superimposed layers of conducting material having a dielectric comprising montanic acid disposed between the adjacent layers.

6. An electric condenser having a dielectric comprising absorbent material impregnated with a dielectric substance containing montanic acid.

7. An electric condenser having a dielectric comprising paper impregnated with a dielectric substance containing montanic acid.

8. An electric condenser including alternate sheets of conducting material and dielectric material, the dielectric material comprising sheets of paper impregnated with montan wax.

In testimony whereof, I have hereunto subscribed my name this 31st day of May, 1917.

PHILLIPS THOMAS.